E. A. COWPER.
Cotton Gin.
No. 53,753.
10 Sheets—Sheet 1.
Patented April 3, 1866.
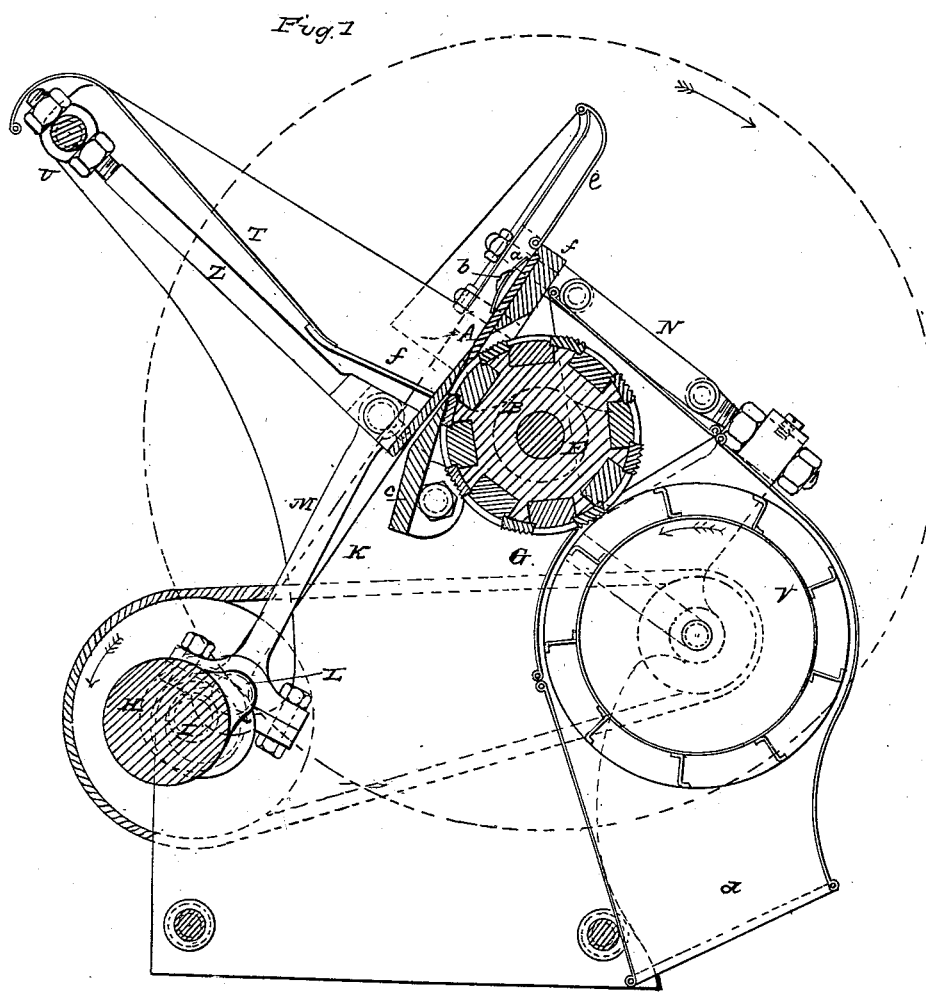

E. A. COWPER.
Cotton Gin.
No. 53,753.
10 Sheets—Sheet 2.
Patented April 3, 1866.
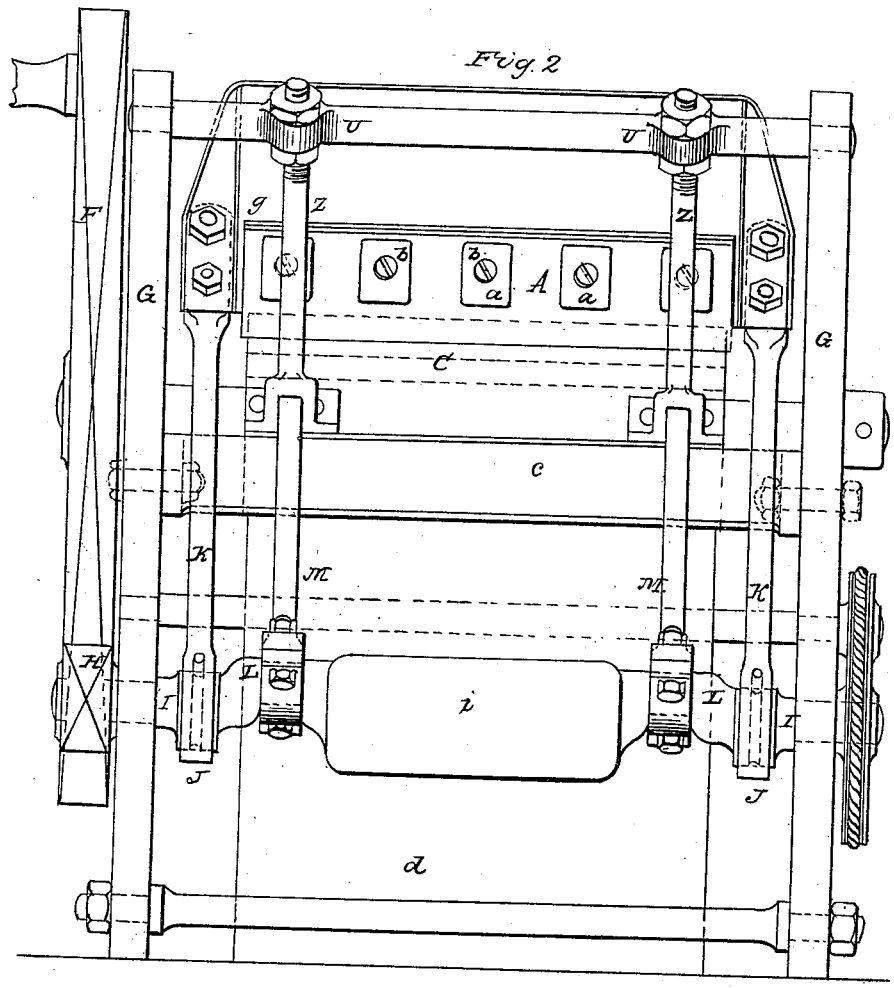
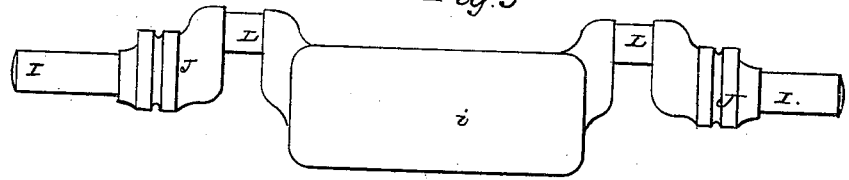

E. A. COWPER.
Cotton Gin.
No. 53,753.
10 Sheets—Sheet 3.
Patented April 3, 1866.
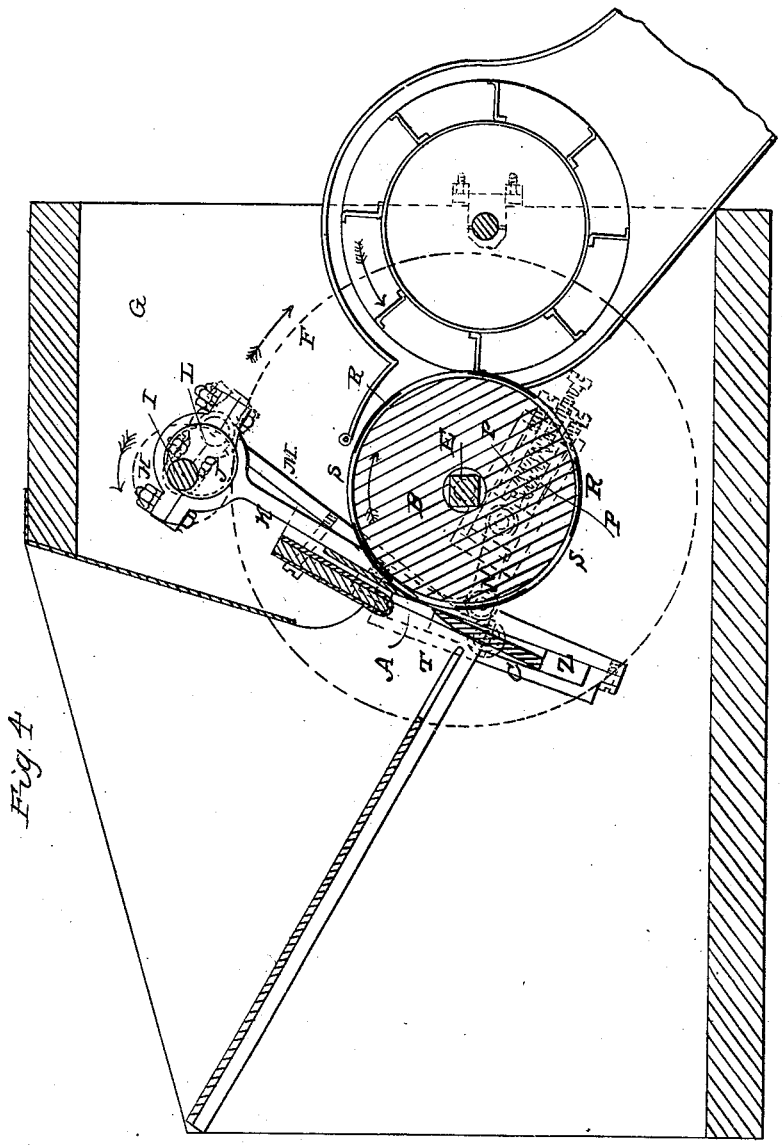

E. A. COWPER.
Cotton Gin.
No. 53,753.
10 Sheets—Sheet 4.
Patented April 3, 1866.
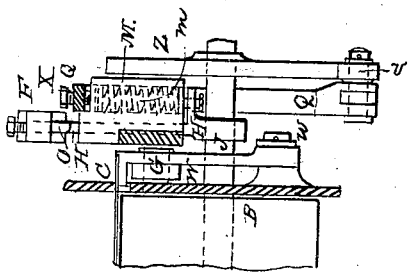
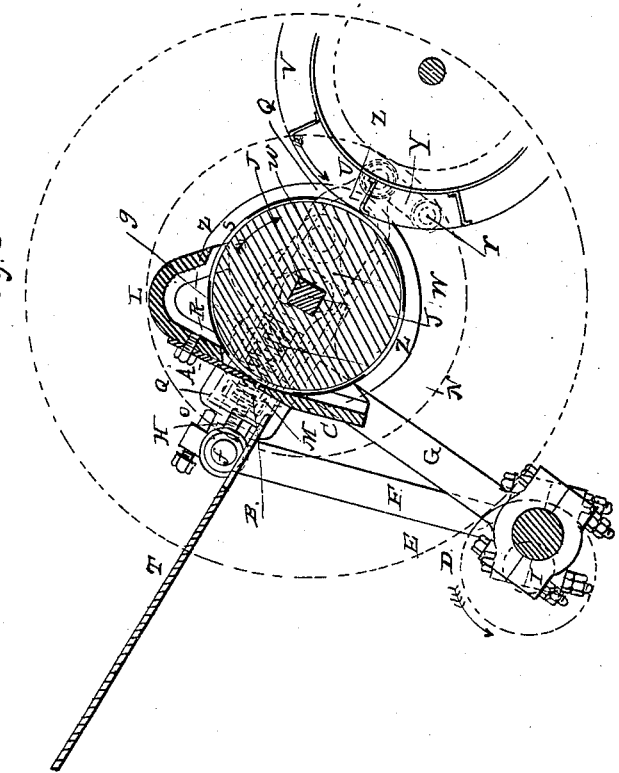
Witnesses
C. D. Abel
Jno Taylor
Inventor
E A Cowper E. A. COWPER.
Cotton Gin.
No. 53,753.
10 Sheets—Sheet 5.
Patented April 3, 1866.
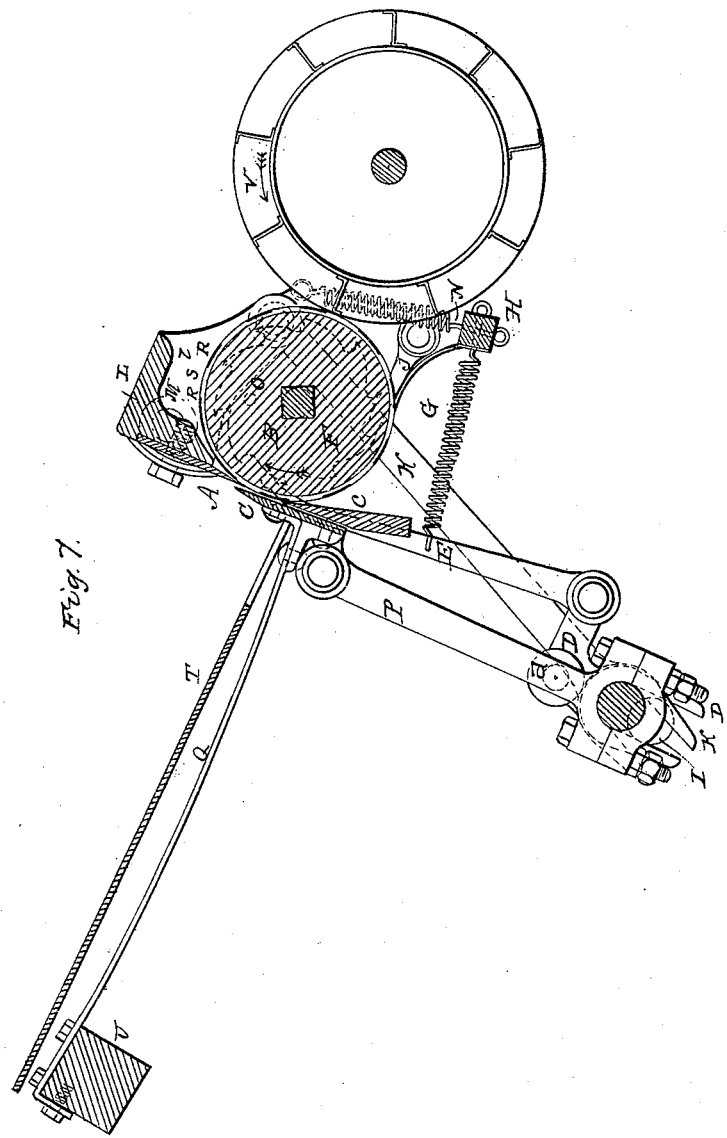
WITNESSES
INVENTOR E. A. COWPER.
Cotton Gin.
No. 53,753.
10 Sheets—Sheet 6.
Patented April 3, 1866.
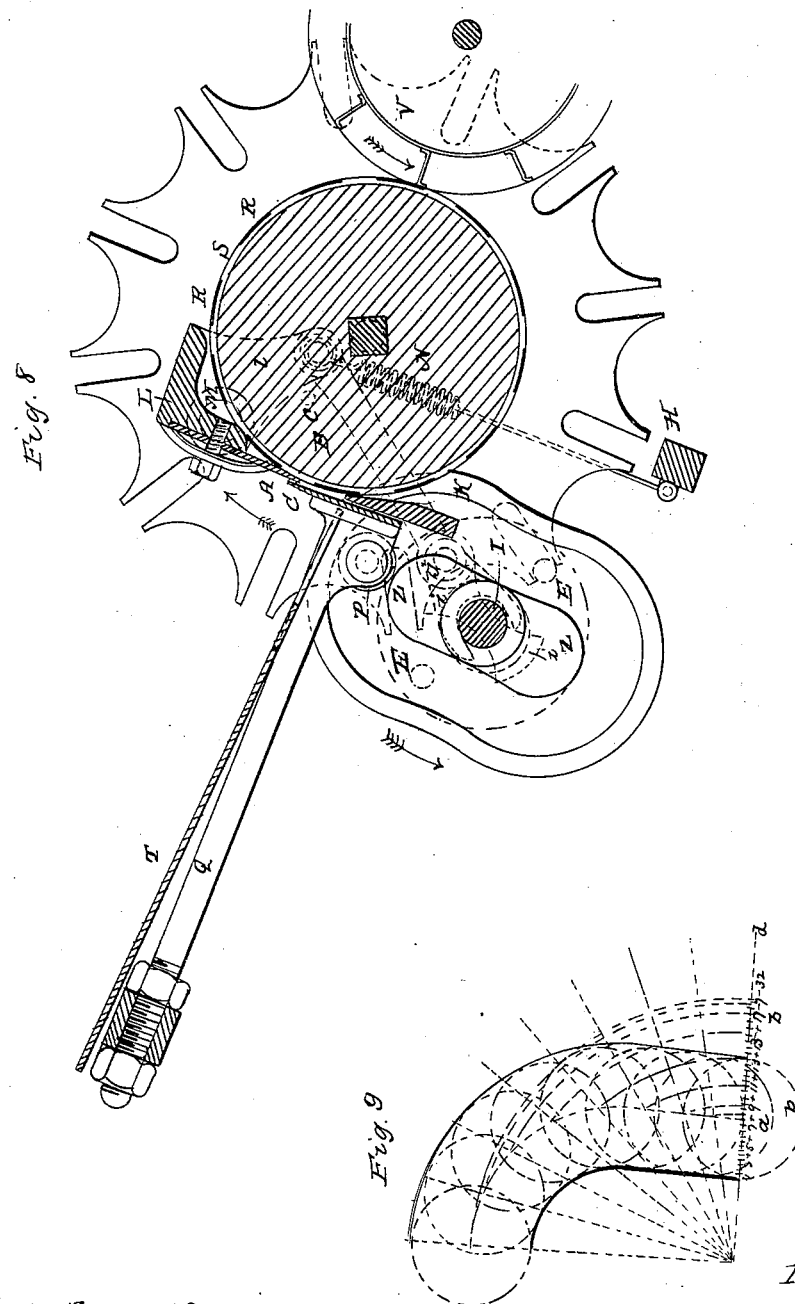

E. A. COWPER.
Cotton Gin.
No. 53,753.
10 Sheets—Sheet 7.
Patented April 3, 1866.
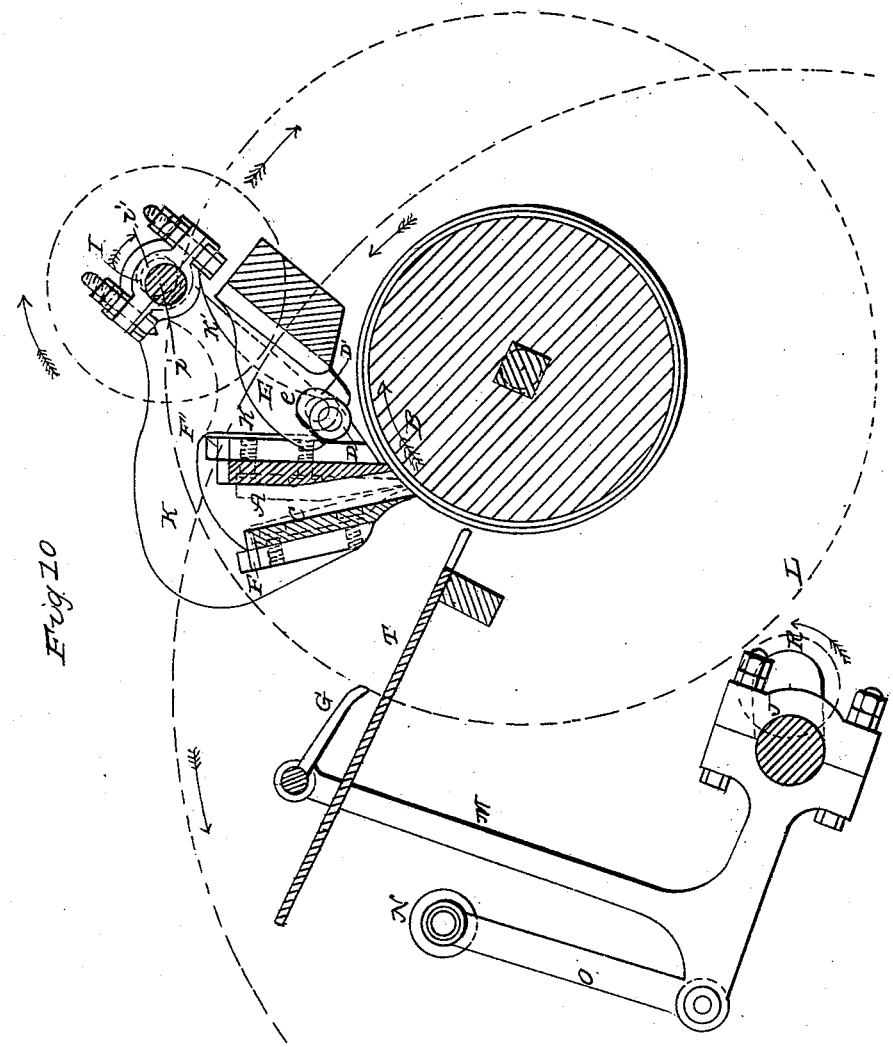

E. A. COWPER.
Cotton Gin.
No. 53,753.
10 Sheets—Sheet 8.
Patented April 3, 1866.
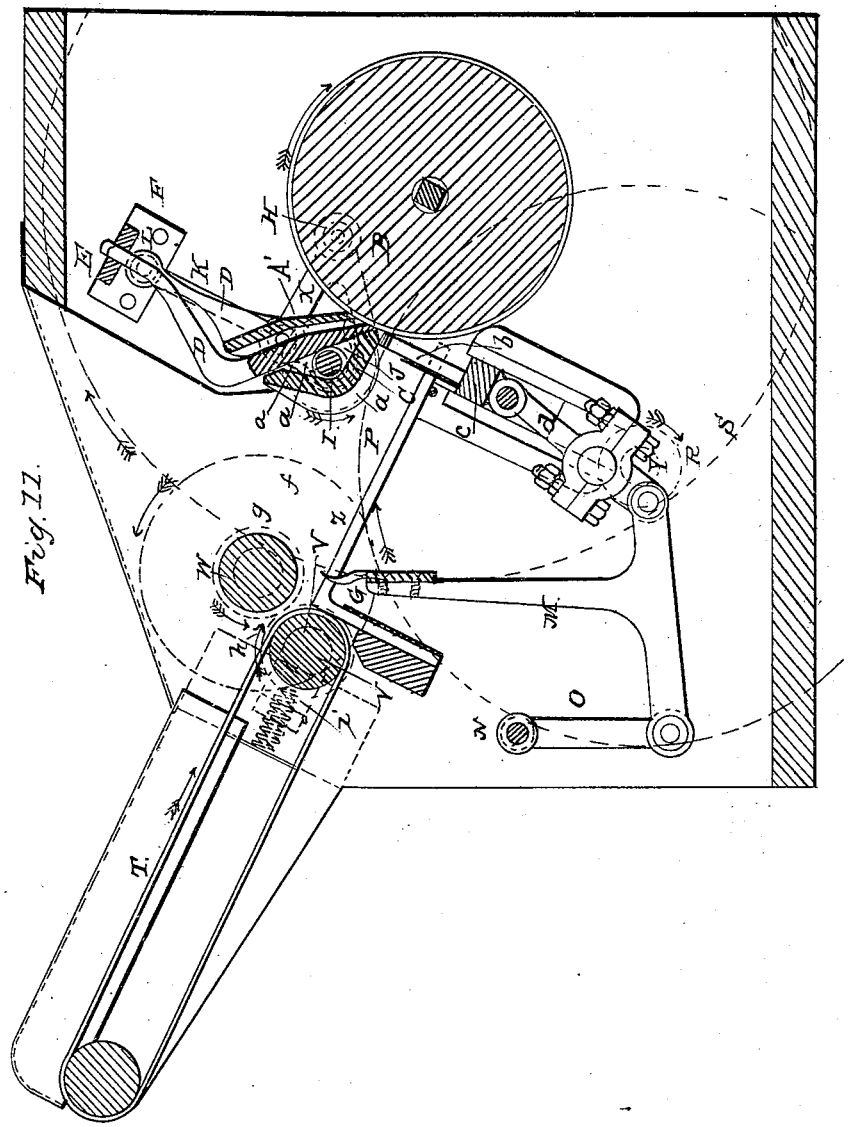
Witnesses
Inventor E. A. COWPER.
Cotton Gin.
No. 53,753.
10 Sheets—Sheet 9.
Patented April 3, 1866.
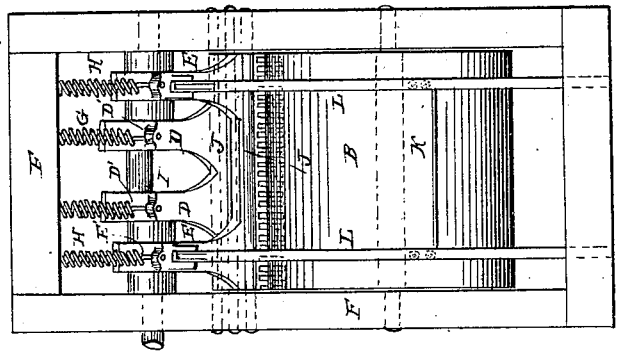
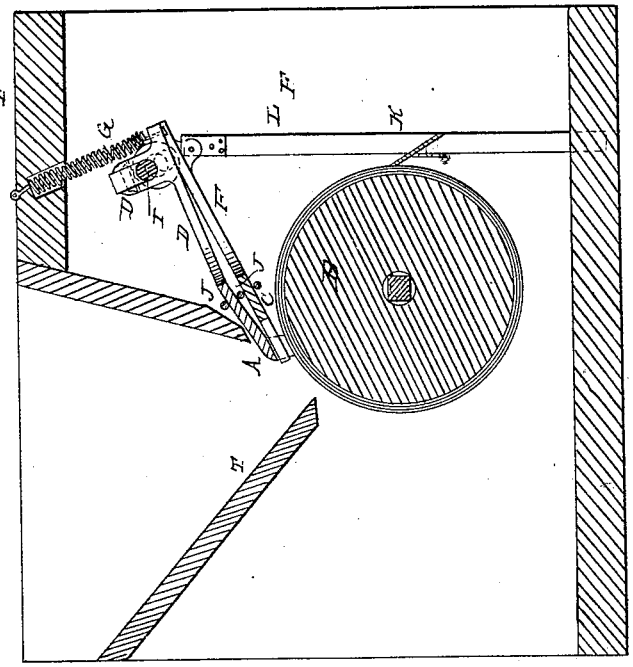

E. A. COWPER.
Cotton Gin.
No. 53,753.
10 Sheets—Sheet 10.
Patented April 3, 1866.
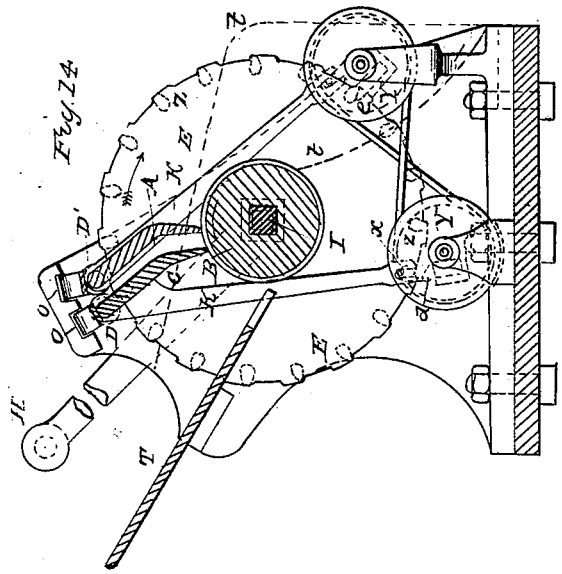
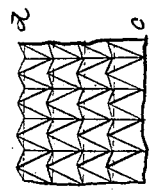
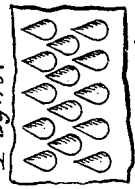
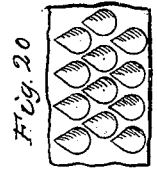
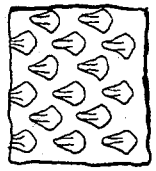
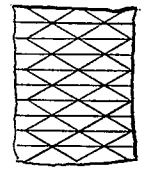
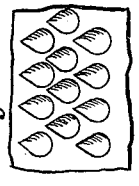
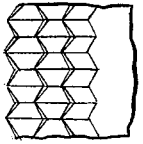
WITNESSES
INVENTOR

UNITED STATES PATENT OFFICE.

EDWARD ALFRED COWPER, OF WESTMINSTER, GREAT BRITAIN.

IMPROVEMENT IN COTTON-GINS.

Specification forming part of Letters Patent No. 53,753, dated April 3, 1866.

*To all whom it may concern:*

Be it known that I, EDWARD ALFRED COWPER, of No. 35ª Great George street, Westminster, in the county of Middlesex, in the Kingdom of Great Britain, have invented Improvements in Machinery or Apparatus for Separating Cotton Fibers from the Seeds; and I do hereby declare that the following is a full and exact description of the said invention, reference being had to the accompanying drawings and to the figures and letters of reference marked thereon—that is to say:

My invention consists in separating cotton fiber from the seed by taking hold of the fiber of the cotton in a positive manner, very nearly close up to the seed, by surfaces caused to approach so as to nip or hold, and while the fiber is so held by one part of the apparatus another part pushes the seed away, thus separating fiber of the full length, or very nearly so, instead of breaking the fiber into short lengths, as is the case with roller and saw gins, which either take hold of the fibers at a considerable distance from the seed or only take an imperfect hold of the fibers. The holding-instruments are made to work intermittently or alternately, or in order, when several are used; but I prefer to use two sets to work alternately, so that one set may hold the fiber or draw it away, while the other set pushes the seeds away, and thus separates the fiber from the seeds.

The above-described operation may be effected either by nipping the cotton fiber between two opposite pairs of the before-described holding-instruments, or between one pair and a revolving roller or traveling band or table consisting of a number of bars having a motion similar to that of screw-gills. The requisite motion for the holding-instruments is given by means of eccentrics, cranks, cams, or other suitable mechanism.

It has been found in all cotton-gins of the several ordinary constructions, such as saw-gins, MacCarthy gins, and churkas, that there is either great imperfection in the way in which the fibers are taken hold of, or the point at which the fibers are taken hold of is too remote from the seed, and these causes result in each case in great deterioration in the quality of the fiber from the very large amount of breakage that takes place. Indeed, it has been proved by actual measurements that fibers commonly lose one-fifth of their length when passed through a good gin of modern construction, and a good deal of fiber is wasted by being left on the seed. The greatest destruction of fiber takes place with the saw-gin, as no one tooth of a saw can by any possibility take hold of a fiber except by looping or doubling it across the front of such tooth; and, as the attachment of the fiber to the seed is equal to the full strength of the fiber, it follows that the fiber is more likely to break at the point where the strain is put onto it than at its junction with the seed, on account of the additional resistance caused by the guards on each side of the saw. The seeds are never thoroughly cleaned, and therefore fiber is lost, as well as that obtained being shorter than the natural length. The MacCarthy gin holds the fibers in a very imperfect manner, as their hold upon the fiber is only due to the difference between the friction of the fibers on a leather surface and on a polished-steel surface. Thus, if the friction on the leather is three times that on the steel, it follows that there is only three, less one, or a friction of two, to carry the fiber beneath the doctor and to retain it when the beater strikes the seed, and to a large extent the fibers are drawn back from beneath the doctor at every stroke of the beater, thus breaking some fibers while others are carried away with the seed, and it is only after the fiber has been again and again drawn in that the seed is at last tolerably well stripped of fiber. It is obvious that the pressure of the doctor on the leather roller must at all times be kept below that at which the surface of the leather will fray or be abraded by the friction and heat generated by continually rubbing against the steel doctor, so that the power of holding is very small indeed, the seeds are not thoroughly cleaned and fiber is thus lost, also that obtained is of less than the natural length. The churkas or simple roller-gins would take rather a better hold of the fiber if one of the rollers were covered with leather, but this is not admissible, as the hard seeds would get pressed into it and form holes. All churkas and simple roller-gins necessarily take hold of the fiber at such a long distance from the seeds as to cause much breakage of fiber between the point of the holding and the seed, in addition to which there is more or less difficulty in getting rid of the seeds when nearly cleaned of fiber, and the cotton on them gets very considerably rubbed by the surface of the rollers continually passing in hard contact with such cotton. If the bottom roller of a churka is of wood, as is usual, the cotton fiber cannot be pinched effectually, and if the requisite pressure for that purpose were applied the roller would wear away too fast, and if the rollers are both of metal the fiber is often injured by them. The seeds always have a certain quantity of fiber left on them, measured, in fact, by the size of the seed and the sizes of the rollers used.

Various other cotton-gins have been made or designed, almost all being mere modifications of the above. Among others, saw-gins have been made with the saws close together, or at very small intervals, but the teeth have sawed away the seeds, besides not taking a good hold on the fiber. Other gins have been designed with a roller and an apron or band passing over a doctor; but I long since designed and tried experiments on this very construction with an apron, and found that the extreme drag of the hard seeds on one side of the apron and the friction of the fixed doctor or concave on the other side of it was more than any material would stand for any length of time. In fact, the friction causes such a heat and strain upon the apron as to destroy it rapidly, and it also cannot be made to retain the fiber when the beater acts on the seed either with an elastic or non-elastic roller.

Now, according to my invention, the cotton fiber is intermittently nipped in a positive manner—that is, very much in the same way as it would be nipped by the jaws of a vise—very close up to the seed, which is thrust away while the fiber is so held, thus separating the fiber of the full natural length, or very nearly so. The nipping-instruments may be considerably varied in form, but must not be made with edges rounded off to any great extent, or with edges so cut off as to form too taper a mouth for the entry of the cotton, for if this were the case there might be a danger of the seeds entering between the nipping-instruments with the cotton.

In putting my invention into practice it is necessary to form the two nipping or holding instruments of such materials as are capable of taking a very firm hold of the fiber, when, by the action of the machine, they are at intervals forcibly brought together for a short time, so as to nip or hold the fiber of the cotton in a positive manner while the seeds are removed, or partially removed, by the action of another part of the machine. When the nipping or holding instruments are in the act of nipping they should either be stationary, or, if in motion, the different instruments making the nip should be moving at one and the same speed as nearly as possible, so that there may be little or no motion of one instrument in relation to the other, and consequently little or no friction generated. I have found that a roller with good sound leather on it is well adapted to form one of the nipping or holding instruments, but the leather must be firm enough to stand a much heavier pressure than what is commonly put onto the roller in a MacCarthy gin by means of the doctor, and this heavier pressure the leather will stand perfectly well, as there is no motion, or scarcely any motion, between the holding-instrument and the leather at the time. Now, if the friction on the leather is three times that on the holding-instruments, it follows that there is a friction of three, plus one, or a total of four, to hold the fiber, and if the pressure is only three times that used in a MacCarthy gin to press the doctor against the roller, it follows that there is three times four, or a total of twelve, to hold the fiber securely, as against two in a MacCarthy gin, and thus there is no difficulty in retaining the fiber. The holding-instruments are made to work intermittently or alternately or in order, care being taken that when one part of the apparatus is pushing away seed the fiber is firmly held by the holding-instruments—such, for instance, as a metal roller with or without leather on it, and a strong blade somewhat similar to a doctor in a MacCarthy gin.

According to one arrangement of my invention the intermittent action of a pair of nipping-instruments is accomplished by causing a roller, which forms one nipping-instrument, to revolve continuously and draw in fiber, either by a simple leather surface or pointed surfaces placed intermediately between leather or metal surfaces on the roller, and then causing a second nipping-instrument or doctor to move at the same speed as the roller and nip upon the fiber on the leather or metal surface of the roller, and then during the short interval it is so nipped to push off the seed from such fiber by a pushing-instrument or beater. The requisite motions for the second nipping instrument or doctor may well be obtained by cams, cranks, eccentrics, or other mechanism; but a crank or eccentric is found to be an exceedingly easy and effective appliance for the purpose, as, at the same time that it gives a very quick and easy motion, it is easily arranged so as to move the end of a connecting-rod as to cause a nipping-instrument fixed to it to move not only quickly with the roller and quickly back again, to be ready for a second nip, but also to move toward the roller to take the nip, and from the roller at the time the nip must be relieved, for the roller to continue its rotary motion, while the nipping-instrument returns clear of the roller. Such return of the nipping-instrument clear of the roller allows of a roughened or pointed surface being used on that part of the surface of the roller that so passes out of contact with any fixed object.

The beater or pushing instrument can easily be made to slide in guides on the connecting-rods that carry the nipping-instrument, so as to work correctly past the edge of such instrument at the moment of pushing off the seeds, or it can be separately mounted and adjusted to beat at the right moment. It can also very well be worked by cranks, cams, or other mechanism. It is convenient, in order somewhat to prolong the time of nipping, to let the connecting-rods on which the nipping-instrument is fixed be confined by short links or in curved guides, so that the path of motion of the nipping-instrument shall conform to some extent with the curvature of the roller. It is not necessary, in order to get the motion of the nipping-instrument and of the beater, to have two cranks of different strokes, or cranks and eccentrics, as a short stroke can be obtained for the nipping-instrument by a long lever, and a long stroke for the beater by a short lever, from one and the same crank; and, again, the time of nipping and the time of beating can be regulated by the angles at which the connecting-rods take their motions from the same crank. The very small motion required to cause the nipping-instrument to nip can be got easily from a cam, even if the machine runs at a very high velocity indeed. It may be observed that the feed of fiber taken in at each nip is so much in excess of anything that a MacCarthy gin can manage or cope with that far more work is done with the same surface speed.

According to another arrangement of my invention the roller, having first, by a partial revolution, drawn in a quantity of fiber between it and the strong blade or holding-instrument, is caused to stand still for a short space of time, when the strong blade or holding-instrument is made to press the fiber between it and the roller in a forcible and positive manner. Next, the beater pushes off the seed while the fiber is so held up close to the seed, and after this the beater retires, the strong blade or holding-instrument recedes from the roller a little way, and the roller again makes a partial revolution, again drawing in fiber between it and the strong blade or holding-instrument, and the process is repeated and continued.

The holding-instruments are made to work alternately according to another arrangement of my invention, one being placed behind the other, but both just above the surface of a third holding-instrument in the form of a roller with leather on it. Now, on the roller partially revolving and drawing in fiber, the first holding-instrument is pressed in a forcible manner upon the fiber that is thus on the surface of the roller, and as it moves with it the fiber is thus carried toward the second instrument, which has been moved toward the first instrument, but at the same time out of contact with the roller. This second instrument is then made to nip upon the fiber brought forward to it by the first instrument, which then moves out of contact with the roller, and makes another move to push away the seeds belonging to the fiber that is nipped and held by the second instrument and the roller, and at the same time the first instrument, while so pushing away seeds, passes over or onto more fiber brought forward by the roller. Thus every portion of fiber, as it comes forward, is nipped and held first by the first instrument and the roller, and then by the second instrument and the roller, while the first instrument returns and pushes away the seeds. A slight variation in this arrangement consists in adding a pushing-instrument to move near to the face of the first nipping-instrument, in a slanting direction toward the roller, but only to move away the seeds so far as it can do so without striking the roller or passing it. This instrument can well be worked off the second nipping-instrument or off its crank or other source of motion.

Another arrangement of nipping-instruments working alternately according to my invention consists in two sets of fingers and spaces, the one set of fingers working through the spaces of the other set, the fingers and spaces being, however, so narrow as to cause one or more fingers of each set to act upon the fibers of one seed and to prevent seeds passing through the spaces, as the sets of fingers are alternately raised a little off the surface of the nipping-roller and thrust forward to nip upon more fiber. As the roller revolves the fingers that are nipping retire with it, taking the fiber with them, while the other set of fingers that are not nipping are thrust forward between those that are nipping and thus push away seeds, so that each set alternately push away seeds.

One very simple arrangement, according to my invention, consists in causing two nipping-instruments to act on a third one in the form of a roller by means of two cams, one on each side of the machine, which lift the instruments alternately and cause them, when lifted, to move back to take in fiber, while when nipping they move forward with the roller to take the fiber through the machine.

On the accompanying drawings are shown various arrangements of machines by which my invention may be put in practice.

Figures 1, 2, and 3, on Sheets I and II of the accompanying drawings, show the arrangement which I prefer to employ. Fig. 1, Sheet I, shows a transverse section of the machine. Fig. 2, Sheet II, shows a front elevation of the same with the feed-board T removed, and Fig. 3, Sheet II, shows a detached view of the crank-shaft I.

In this arrangement the separation of the cotton fiber from the seed is effected by the nipping-blade or doctor A being made to hold the cotton in a positive manner and very nearly close up to the seed against the surface of the roller B, while the striking-blade or beater C is made to push away and separate the seed from the cotton fiber so held. The roller B, which is covered with alternate strips of pointed surface R and leather S, receives for this purpose a continuous rotary motion in the direction of the arrow, while the nipping-blade or doctor A is caused, first, to descend at a certain distance (less than the size of the cotton-seed) away from the surface of the roller B in order to allow a quantity of cotton fiber to be drawn in between it and the surface of the roller It is then caused to approach and press forcibly upon the leather or metal surface of the roller, thus nipping the fiber in a positive manner, and while doing so it is made to ascend and travel with the roller a short distance. At the same time the striking-blade or beater C rises with a quicker motion and strikes away the seeds of the fiber that are being held by the nipping-blade A and the roller B. The beater C then quickly descends again, and the before-described operation is repeated.

The various motions required for this purpose are produced in the following manner: The roller B is fixed upon the spindle E, carried by the framing G, and receives a rotary motion in the direction of the arrow. Upon the same spindle E is fixed the spur-wheel F, in gear with the spur-pinion H, imparting motion in the direction of the arrow to the crank-shaft I, also carried by the framing G. This crank-shaft I imparts motion to the nipping-blade A by means of two eccentrics, J, and connecting-rods K, and to the striking-blade C by means of two cranks, L, and connecting-rods M. The upper ends of the connecting-rods K are fixed to a bar, $g$, to which the nipping-blade is attached in an elastic manner by means of springs $a$ and screws $b$. The bar $g$ is also connected to links N, the other ends of which are fixed in an adjustable manner to a lug or bar, O, on the framing. The effect of this connection upon the motion of the nipping-blade A is as follows: When the eccentrics J are moving it in a downward direction they are performing that half of their revolution in which they are farthest away from the working face of the roller B, and therefore, owing to the connection of the nipping-blade to the links N, they cause the former to travel downward a small distance from the face of the roller, and in a curved path corresponding very nearly with the curved surface of the roller, so that the distance between the blade and the roller during the greater part of such downward motion is nearly constant. This distance, as before stated, is never quite equal to the dimensions of the cotton-seeds, which are consequently kept back by the edge of the blade A while the cotton fiber is being drawn between its surface and that of the roller by the strip of pointed surface R, which at that time is passing behind the nipping-blade. When the eccentrics J, and consequently the blade A, have arrived at the end of their downward stroke the motion of the former brings the latter forcibly against the leather surface S of the roller, and the cotton fiber is thus firmly nipped between the surface of the blade and the roller, which nipping action, owing to the before-mentioned curvilinear path of the blade A, resulting from its connection to the links N, continues during part of the upstroke of the blade A, which is made to move at the same surface speed as the roller B, so that no appreciable rubbing action takes place between them during such upward motion. While the cotton fiber is being held in the before-described manner close up to the seed, the beater C fixed to rods Z, working on centers at U, is raised by the cranks L and connecting-rods M, so as to pass close against the edge of the nipping-blade A, and is thus made to push away and separate the seed from the fiber that is being held. The beater then again descends, while the nipping-blade A, having arrived near the end of its upstroke, begins to move away from the surface of the roller, and then performs its downstroke, as before described, the cotton fiber from which the seed has been removed being carried away by the roller, which at the same time draws a fresh quantity to be acted upon in like manner. A stop-bar, $c$, is fixed behind the beater C, in order to prevent the seeds that are separated from the fiber from passing between the back surface of the beater and the roller, and thus impeding the action of the machine. As the cotton fiber passes round on the surface of the roller B it is removed therefrom by the revolving doffer V, receiving motion from the crank-shaft I, and passes down the spout $d$. The inclined feed-table T, together with the guard $e$, fixed to the bar $g$ of the nipping-blade A, forms a hopper from which the seed-cotton readily feeds into the machine, the seeds that are separated being made to fall out through the grid at $f$. A balance-weight, $i$, is formed on the crank-shaft I for the purpose of balancing the cranks and connecting-rods in motion.

The above-described arrangement of cotton-gins, although only separating cotton fiber from the seed intermittently, has been proved, in respect of the quantity of cotton ginned in a given time, to surpass by far the capabilities of the MacCarthy or churka gins, and to approximate very closely to those of the saw-gin, while the fiber, instead of being broken up and thus greatly depreciated in value, as is the case with the saw-gin, is separated of its full natural length from the seed, being generally from one-eighth to three-sixteenths of an inch in excess of the length of staple produced by the best arrangements of MacCarthy gins. In addition to this, owing to the absence of any appreciable friction of the nipping-blade upon the leather surface of the roller, no rapid deterioration of the latter takes place, as is the case with the leather covering of the MacCarthy roller, which, owing to the great friction of the doctor upon it, has to be renewed so frequently as to render the annual charge for maintenance very heavy. In comparison with the MacCarthy gin the new gin is very economical in respect of maintenance, whether the surface of the roller is made entirely of metal or is provided with narrow strips of leather of common quality.

Fig. 4, on Sheet III of the drawings, shows a vertical section of a machine in which the general arrangement and mode of operation of the several working parts is precisely the same as in the just-described arrangement. The various corresponding parts are designated by the same letters of reference, and therefore need not be again described. The only difference consists, first, in the placing of the crank-shaft I and connecting-rods above the roller B instead of below it; secondly, as the nipping-blade A is in this arrangement fixed rigidly to the connecting-rods K, a certain amount of elasticity is afforded to the attachment of the link N by connecting the block O to a strong spring, Q, and adjusting its position by means of set-screws P P; thirdly, the beater C, instead of being guided in its motion in the manner described in the former arrangement, is here made to work up and down in loops Z, formed on the ends of the connecting-rods K, and as by this means the beater never moves far enough away from the roller B for seeds to get behind it, the stop-bar is in this case omitted.

Fig. 5, Sheet IV, shows a vertical section, and Fig. 6 shows a part sectional plan, of a machine in which, as in the previous arrangements, the nipping-blade A nips the cotton fiber against the surface of the roller B, having a continuous rotary motion in the direction of the arrows, then rises up with the roller, while the striking-blade C separates the seed from the cotton so held, and then the blade A separates from the roller and descends again to take a fresh nip upon the fiber that has meantime been drawn in by the roller B. The requisite motions are in this case effected in the following manner: The roller B receives rotary motion from the crank-shaft I through the pinion D and spur-wheel E. The crank-shaft I imparts motion to the connecting-rods F and G, of which F is attached to a lever, H, working upon the same center J as the roller B. Upon the lever H is a slide, K, capable of moving to and fro to a slight extent, to which slide is attached a bar, L, carrying the nipping-blade A. The slide K has a box, M, formed on one side of it, the space of which is divided by a fixed partition, m. A spring, N, is made to press against this partition and against a lug, h, formed on the lever H, whereby the slide K will be pressed toward the stop O on the lever H, and consequently the blade A will be pushed away from the roller B. In the other side of the box M is a second stronger spring, P, and a looped link, Q, attached at one end to a link, R, working on a fixed center, r, carries at the other end a screw, X, which, when the link Q is drawn back by the thrust of the cam Z on the truck U, is caused to press upon the spring P, and thus, overcoming the action of the spring N, presses the slide K in the same direction, whereby the blade A is pressed against the roller B. Thus it will be seen that the blade A receives an up-and-down motion from the crank I, (which motion corresponds in curvature to the curved surface of the roller) and a motion to and from the roller by the arrangement just described. The striking-blade C receives the requisite up-and-down motion from the crank I through the connecting-rod G, hinged at g to the link W, working on a fixed center, w, to which link the blade C is attached. Although both the nipping-blade A and striking-blade C are worked by means of one and the same crank-shaft, I, yet the blade C moves up past the edge of the blade A, because the motion of C is rendered considerably greater than that of A on account of the distance of A from the fulcrum J of the lever H being less than that of the point f, to which the connecting-rod F is attached, while the distance of C from the center w is greater than that of the point g, at which the connecting-rod G is attached. As in the previous arrangements, the surface of the roller B is covered with strips of fish-skin or other similar suitable material at those parts with which the blade A does not come in contact.

V is a doffer for removing the cotton fiber from the roller B.

Fig. 7, Sheet V, shows a vertical section of a machine in which a nipping or holding instrument or strong blade, A, is intermittently forced against and removed slightly from the surface of the roller B, which remains stationary while the blade A is forced against it, and receives a partial rotary motion in the direction of the arrow at the time that the blade is removed from it. The distance which the blade A is removed from the roller is not equal to the dimensions of the cotton-seed, so that when the blade A is away from the roller, and the latter, by its motion, draws in fiber between it and the blade, the seeds are prevented from passing in by the edge of the blade, and when this is pressed forcibly against the surface of the roller the cotton is nipped or held between the two instruments A and B in a positive manner, very close up to the seed, and while it is so held the striking blade or beater C is made to rise and push away the seeds therefrom. When this has been effected the nipping-blade A is again removed from the surface of the roller, which again performs a portion of a revolution and draws in fresh cotton fiber, the striking-blade or beater C having at the same time descended out of the way. The various motions for this purpose are all obtained from one and the same crank-shaft, I, in the following manner: The bell-crank lever D, working upon a fixed center, d, has a reciprocating motion imparted to it by the crank-shaft I working in its lower forked arm, which reciprocating motion it imparts to the pawl E, actuating the ratchet-wheel F fixed on the spindle of the roller B, which thereby receives the before-described intermittent motion in the direction of the arrow. The pawl E is pressed against the ratchet-wheel F by means of the spring G, fixed to it and to the beam H carried by the framing, and a second fixed pawl, J, insures the accurate motion of the roller. For actuating the nipping-blade A the crank on the crank-shaft I works in the forked end of the connecting-rod K, the upper end of which is connected to the tail *l* of the beam L, to which the blade A is fixed, and which turns upon the centers M, so that the beam L and blade A receive a reciprocating motion on the centers through the motion imparted to the connecting-rod K, the latter being made to force the blade A against the roller when the crank-shaft I is performing the upper half of its revolution, while the spring N, attached to the beam H and the tail *l*, draws the blade A away from the roller B, while the crank-shaft I performs the other half of its revolution, the extent to which the blade A moves away from the roller being governed by the tail *l* coming against the stop O. The motion of the beater C is also effected by the crank-shaft I by means of the connecting-rod P, the beater C being fixed to an elastic arm, Q, the other end of which is fixed to the beam U, carried by the framing. The elasticity of the arm Q allows of the motion of the beater C communicated to it by the connecting-rod P, and thus avoids the necessity of a joint at U. The seed-cotton is fed forward to the machine from the table T. The roller B is wholly or partially covered with leather, and as the nipping-blade A is always pressed against the same portions, S S S, of its circumference in rotation, I am enabled to fix upon the intervening portions strips of fish-skin, R R R, or other suitable materials having small projections, which draw in the cotton fiber very effectually when the blade A is slightly removed from the roller.

V is a doffer for removing the cotton fiber from the roller B, as in the previous arrangements. *c* is a stop bar, as in the first arrangement, for preventing the seeds from getting between the beater and roller.

Fig. 8, Sheet VI, shows a vertical section of an arrangement in which the nipping-blade A, the roller B, and the striking-blade C have very nearly the same relative motions as in the previous arrangement, being, however, in this case produced by means of cams on the cam-shaft I, whereby I am enabled to obtain two strokes of the machine to one revolution of the cam-shaft, in addition to which I am also enabled to vary the rate of motion of the various parts, as may be required, it being desirable for very high speeds to make all the motions as easy as possible. These motions are obtained as follows: The two pins E E, fixed in a plate on the cam-shaft I, work successively into the slots in the "star-wheel" F, fixed on the spindle of the roller B, so that on each complete revolution of the cam-shaft I in the direction of the arrow the star wheel F is moved forward and is stopped twice, thus imparting the required intermittent motion to the roller B. For actuating the nipping-blade A the shaft I is provided with a cam having two small projections, *i i*, which act against a truck, *j*, on the connecting-rod K, attached to the tail *l* of the beam L, to which the blade A is attached and which turns upon the centers M. The motion of the blade A from the roller B is effected by the spring N, as before. The motion of the beater C is effected by the cam Z actuating the truck P attached to the arm Q carrying the beater, which arm may either be rigid, as shown, or elastic, as in Fig. 7. C is the stop-bar, as before. The roller B may, for the sake of lightness, be made hollow. The intermittent motion of the roller B may also be conveniently obtained by connecting it to the driving power at intervals, by means of a conical or other friction-clutch, or by means of a band tightened at intervals, or by Robertson's frictional gearing put into gear at intervals, or by gearing similar to Roberts' contact and cam shaft, or other well-known mechanical contrivance may be employed. The nipping action may be given by cams, toggle-joints, screws, or various other mechanism, and the nipping-edges, fulcra, curved guides, or the bearings of the rollers may be made to yield in all cases by being provided with powerful springs, so that if too large a quantity of fiber enters it may not be injured.

At Fig. 9, sheet VI, is shown, for easy reference, the means of setting out cams so as to produce as smooth a motion as possible. This is not a new plan, but is one that is not known to every workman. It consists, first, simply in dividing the required stroke into a number of divisions that shall represent the series of odd numbers—as, for instance, 1, 3, 5, 7, and 7, 5, 3, 1, and then these divisions represent the distance to which the truck or roller is to be moved in equal times; so if the whole arc in which the motion is to take place is divided into as many equal parts as there are separate numbers in the whole series the place for each fraction of the motion to be set out on will be at once given. For example, in Fig. 9 the required stroke is that from *a* to *b*, and the arc in which it is to be accomplished is that from *c* to *d*. It is therefore only necessary to divide out the stroke *a* to *b* into several divisions, 1, 3, 5, 7, and 7, 5, 3, 1, as shown, and to measure these divisions onto the radial lines which separate the whole arc into the required number of equal parts, as shown. Such points are in the true line of motion of the center of the truck, from which, of course, the sides of the cam-groove can be set out.

Fig. 10, Sheet VII, shows a vertical section of a machine in which the cotton fiber is first nipped against the continuously-revolving roller B by the blade C, which then moves with the roller till it meets the blade A, which is at the same time moving toward it, out of contact with the roller, and which, when close up to the blade C, in its turn is made to nip upon the cotton fiber held by the latter, as indicated by the dotted positions. The blade C is then moved from the roller, and while the blade A is receding the blade C pushes the seeds away from the cotton fiber that is held by the blade A. The blade C then makes a fresh nip on the cotton and the action is repeated. The requisite motions of the blades for this purpose are effected by the crank-shaft I as follows: The shaft I has two opposite cranks, $i$ $i'$, of which $i$ moves the connecting-rod K, to which the blade C is attached, while the crank $i'$ moves the connecting-rod K', to which the blade A is attached. The connecting-rod K carries a truck, D, and the connecting-rod K' carries a truck, D', near its lower end, which truck works up and down in the curved slot $e$ of the fixed brackets E. By this arrangement it will be seen that each blade receives an up-and-down motion equal to the full stroke of the cranks $i$ $i'$, while their motion to and from the roller is diminished from the full lateral motion of the cranks, on account of their distance from the movable fulcra D D' being considerably less than the distance of the cranks from the fulcra D D'. The paths of the blades are furthermore made to conform, as nearly as practicable, in their up-and-down motion, to the curved surface of the roller by the curved form of the slots $e$, in which the trucks D D' move. In order to afford a certain amount of elasticity to the nip of the blades, so as to allow for any unequal thickness of the cotton nipped, or any foreign substance contained therein, the holes through which the screws pass that attach the blades to the connecting-rods are somewhat slotted below, and springs F F', attached to the connecting-rods, are made to keep the blades down in the required position, at the same time allowing the blades to be pushed up slightly by any extra thickness of cotton fiber or by any foreign substance. The feeding apparatus in this arrangement may consist of a comb or series of hooks, G, actuated by cranks J, geared with the machine by spur-wheels R L, the support M for the comb or hooks G being hung by a link, O, from the fulcrum N.

I am aware that combs, oscillating tooth-rollers, or series of hooks have before been proposed as self-acting feed apparatus to ordinary gins, as described in the English patent granted to Charles Garnett, bearing date 17th March, 1859, No. 637.

Fig. 11, Sheet VIII, shows a vertical section of an arrangement in which the cotton fiber is first nipped against the revolving roller B by the blade A. This blade then moves up with the roller B till it meets the blade A', which at that time is descending apart from the roller. The blade A' is then pressed down upon the roller, nipping the cotton that is held by the blade A, which at the same time is raised from the roller and descends again to take a fresh nip, the pushing-blade C being made to approach the roller to push away seed at the time that the blade A is rising. To effect these motions the spindle I, having a quick rotary motion imparted to it in the direction of the arrow, has two small opposite cranks or eccentrics, J J', of which J works in a boss, $a$, formed on the blade A, while J' works in a boss, $a'$, formed on the blade A'. The two blades are furthermore provided with arms D and D', the ends of which work up and down in a guide, E, fixed to the framing F. By this arrangement it will be seen that the blades A and A' receive both a slight up-and-down motion in opposite directions, and are also alternately pressed against the surface of the roller B, and are removed a small distance therefrom. To impart the requisite motion to the pushing-blade C, it is attached to or formed in one with the lever X, working on a fixed fulcrum, H, and suspended from the arm D' at L by means of a link, K, whereby it will be seen that the blade C will rise and fall with the blade A', and will at the same time move in the direction of the face of the blade A. The cotton is led forward from the endless traveling apron T and passes between the rollers V and W, where it is caught by hooks G, supported by the reciprocating arm M, working between the bars of the stationary guard Z, and is thrown forward to the nipping-instrument. The motion is transmitted to the rollers V and W by means of the gearing P $f$ $g$ $h$. The roller V is made capable of moving back to a slight extent, to allow for any variation in the amount of cotton passing between it and the roller W, being carried by sliding blocks $i$ pressed outward by springs $j$. The arm M receives its reciprocating motion from the crank-spindle Y, which also imparts the requisite quick motion to the spindle I by the spur-wheel P in gear with the pinion Q, and the requisite slow motion to the roller B by the pinion R and internal spur-wheel, S.

$b$ are a number of small bent springs, that are caused intermittently to come in contact with and rub upon the lower edge of the pushing-plate C, for the purpose of facilitating the removal of the seeds therefrom, such springs being fixed to a bar, $c$, which receives an up-and-down motion from the crank-spindle Y through the connecting-rod $d$.

On sheet IX is shown another arrangement by which my invention may be carried into effect. Fig. 12 shows a vertical section, and Fig. 13 shows a back elevation, of the apparatus. In this arrangement the separation of the cotton fiber from the seed is effected by the alternate action of two sets of fingers, A and C, of which the one set passes between the spaces of the other, as shown in Fig. 13, the fingers and spaces being made, by preference, so narrow that two or more fingers of each set can act upon the fibers of one seed. Motion is imparted to these fingers in such a manner that as the one set, A, is nipping the cotton fiber on the roller B, upon which it is fed from the table T, the other set, C, is caused to advance in a slightly-raised position, as shown, and is made to push away the seed situated in front of the fingers A, thus separating it from the fiber that is held by the latter. When the fingers C have advanced a certain distance, and those at A have at the same time receded, still nipping the cotton on the roller B, and thus carrying the roller round with them, the fingers C are made to nip down upon the cotton close up to the seed which they have been pushing before them. The fingers A now advance in a slightly-raised position, and in their turn push the seeds from the front of the fingers C, thereby separating the cotton close to the seed. The requisite motion for this purpose is imparted to the fingers by the cranks on the crank-shaft I, working in slots D' E', formed in the arms D E, to which the fingers A C are attached, the fingers being thereby made to work backward and forward between the fixed guide-bars J J J. The fingers are pressed in a forcible manner upon the roller B by means of springs G G H H, attached to the arms D E and to the framing F. As the cotton that has been separated from the seed passes round with the roller B it is removed from it by the doffer-plate K, carried by the rods L L, receiving a vertical reciprocating motion from the arms E E. The seeds, as they are separated, fall down the front of the roller, and if requisite this may be facilitated by curved spring-blades or springs having a lateral motion placed in front of the fingers.

The cotton may be fed forward to the fingers by any arrangement of feed apparatus or by hand.

In place of the fixed guide-bars J J J curved guides may be used, suitable for rollers or trucks, fixed to the arms D E to work in, so that the motion of the ends of the fingers may more nearly coincide with the curvature of the surface of the roller when they are nipping the fibers on the roller, as shown on Sheet VII.

The roller, in place of being moved simply by the action of the fingers, may be driven intermittently or uniformly, provided that in this case, as in all the other arrangements, the nipping or holding instruments are not caused to nip when moving at any considerable difference of speed from the roller. In some respects this arrangement is to be preferred to the others, as the fiber comes off the seed more exactly as it grew, or, in other words, is less pulled about; but the seeds do not drop away quite so freely as in the other arrangements.

Fig. 14, Sheet X, shows a vertical section of an arrangement which is, in some respects, better adapted to be worked by hand or at a moderate speed than the other arrangements. It consists of a roller, B, covered with leather or other suitable material, and having two cams, E E, fixed one on either end of its axis I, for the purposes, first, of giving the lifting motion to two nipping or holding instruments, A C, to cause them to recede from the roller alternately and allow them to nip or hold the fiber in forcible contact with the roller alternately, when the strong springs Q Q' are allowed to act. Thus when C is in contact with the roller A is out of contact with it, and vice versa. The upper corners of the instruments A C are provided with projecting pins furnished with trucks D D' to run on the cams E, while the extreme ends of the pins work in slots in the framing. The cams E E have also projections Z Z Z on them for the purpose of causing the nipping or holding instruments A C to move toward each other and to recede from each other alternately, and this is effected by the projections Z Z Z coming alternately into contact with the small levers $d$ $e$ on the pulleys Y Y, which are thus caused to partially rotate, first in one direction and then in the other, in consequence of their being connected by a band or cord, W, crossed so as to cause them to turn in opposite directions. Then the pins $x$ $y$, taking into slots in the levers K K' on the nipping or holding instruments A C, cause these instruments to move toward each other and to recede from each other alternately, as before described. Thus the fiber brought forward by the roller B is first nipped by it and the instrument C, and then as the roller partially revolves, with C in hard contact with it, toward A, they carry the fiber toward A, while A advances toward C out of contact with the roller and passes over or onto the fiber so brought to it. It is then made to nip upon such fiber on the roller, as C is caused to recede from the roller, and as the roller continues to revolve the fiber is carried on by the nipping of A hard upon the roller, and as C is at the same time made to return to its first position it pushes away the seed belonging to the fiber nipped by A and the roller, as the edge of C is never far enough from the roller to allow seed to pass between them.

T is a table, on which the cotton may be fed in by hand or otherwise. $t$ $t$ is a tin trough to receive the cotton as it comes through the machine. H is a handle for driving the machine by hand.

I have found that it is advantageous to use in some cases a rougher surface than that of leather for the purpose of drawing in fiber rapidly beneath the nipping or holding instruments when they are out of contact with each other, so that they may at all times have a good supply of fiber to take hold of, and I find that fish-skin, such as is sometimes used for smoothing hard woods, answers the purpose very well, and metal surfaces can also be used with advantage if cut with two or more sets of very fine grooves across each other, so as to leave points somewhat overhanging and very taper in form, which points will then give up or release the fiber very freely on the application of a doffer running rather faster than the pointed surface. Pins of various forms also answer the purpose very well, provided the points are sufficiently obtuse, and are made to overhang enough to take hold of the fiber freely. The pins may well be tinned and put together in quantity and then heated so as to cause the tin to run together and form the whole into a solid mass. Other pins or pointed surfaces may be made in any other well-known manner, and may be fixed onto rollers or formed of the substance of the roller itself, as found most convenient; but in all cases the points or pins must be very close together, so that there may be at least seven under the space covered by a seed. Several examples of such surfaces are shown at Figs. 15 to 21, Sheet X, to a scale of about ten times full size. Fig. 15 shows the points on fish-skin. Figs. 16 and 17 show surfaces formed by cutting fine grooves across each other. Figs. 18 to 20 show pin-surfaces formed of pins soldered together, and Fig. 21 shows a pointed surface formed of plates or blades notched on the edge and placed side by side, either soldered or not. I prefer to employ the pointed surface shown at Fig. 16, as being most readily formed, and I have found it advantageous to make the points of such proportions that twenty of them go to one inch in the direction $a\,b$ and fourteen to the inch in the direction $c\,d$.

Having now described the nature of my invention and the best means of performing the same, I wish it to be understood that I do not claim as part of my invention any of the various arrangements of feeding apparatus hereinbefore described with reference to the accompanying drawings, nor do I claim any of the various details of mechanism when taken separate and apart from my invention; neither do I limit myself to the various arrangements hereinbefore described with reference to the accompanying drawings, as my invention may be carried into effect by various arrangements of machinery, so long as the peculiar character of my invention be retained; but

What I claim in respect of the hereinbefore-described apparatus for separating cotton fiber from the seed is—

1. The intermittent nipping or forcible holding of the fiber of the cotton very nearly close up to the seed by the holding-instruments, caused to approach at intervals so as to nip or hold the fiber while the seeds are detached by another part of the apparatus.

2. The nipping-blade A, roller B, and beater C, operating in combination in any manner, substantially as herein described.

In testimony whereof I have signed my name to this specification, in the presence of two subscribing witnesses, this 13th day of October, 1865.

EDWARD ALFRED COWPER.

Witnesses:
C. D. ABEL,
H. E. TAYLOR.